Patented Oct. 12, 1937

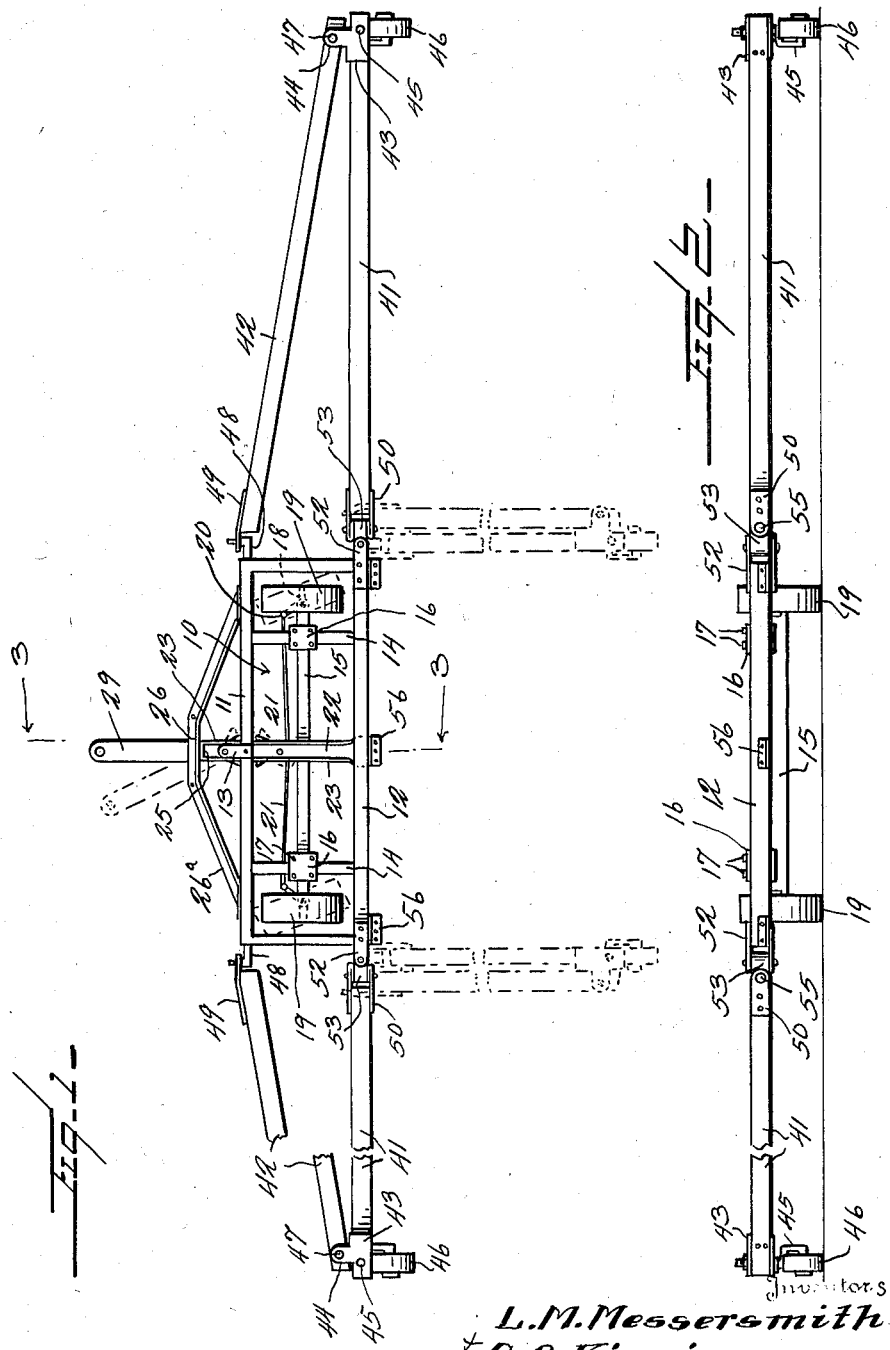

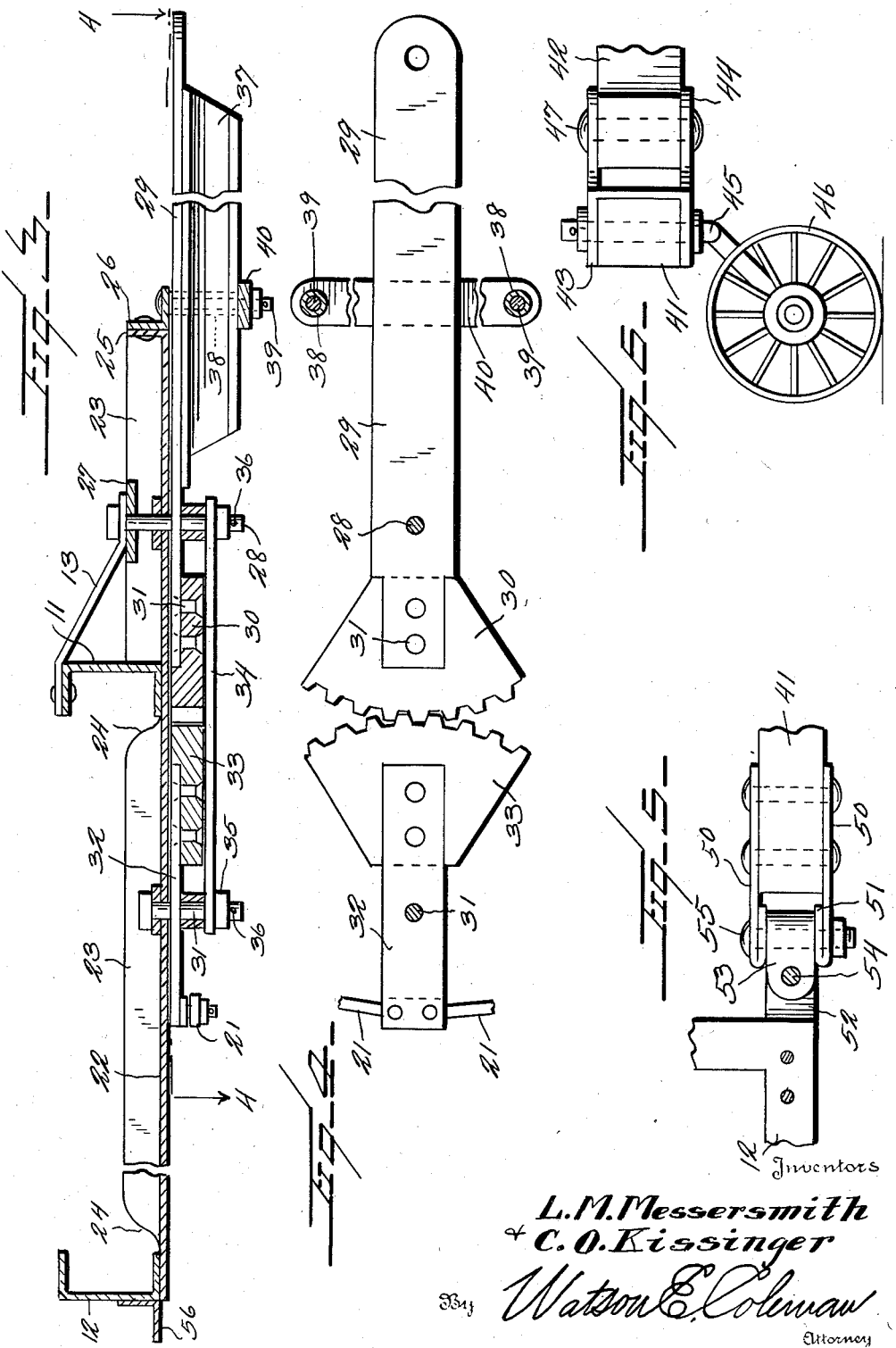

2,095,417

UNITED STATES PATENT OFFICE 2,095,417

FARM IMPLEMENT HITCH

Lewis M. Messersmith and Chester O. Kissinger, Lapwai, Idaho

Application December 3, 1936, Serial No. 114,046

5 Claims. (Cl. 97—235)

This invention relates to draft devices and particularly to a hitch whereby a tractor may be readily connected up with a plurality of harrows, weeders, planters or other farm machinery or implements.

The general object of the present invention is to provide a farm implement hitch which will operate without digging ruts and ditches in the soil when turns are made at the corners or when work is being done on steep ground.

Another object is to provide a structure of this character which is mounted upon main supporting wheels and which is provided with means whereby these wheels are caused to turn in the same direction as the tractor turns, thus keeping the hitch from sliding on hillsides or when making a turn at corners either right or left.

A further object in this connection is to so construct the device that the supporting wheels will turn at a greater angle than the tongue so that the wheels will run directly toward the tractor.

A further object is to provide the main frame of this implement hitch with lateral wings or extensions so constructed that they will fold back in a horizontal plane when necessary in passing through gates or when moving from one field to another, or when traveling along roads.

Another object in this same connection is to so mount these wings that they may have oscillation in a vertical plane to permit the wings to travel over rough and uneven ground.

Other objects will appear in the course of the following description.

Our invention is illustrated in the accompanying drawings wherein:

Figure 1 is a top plan view of an implement hitch constructed in accordance with my invention.

Figure 2 is a rear elevation thereof.

Figure 3 is a section on the line 3—3 of Figure 1.

Figure 4 is a section on the line 4—4 of Figure 3.

Figure 5 is a fragmentary enlarged elevation of the means for connecting the rear frame bar of one wing to the main frame.

Figure 6 is an end elevation of one of the wings and its supporting caster wheel.

Referring particularly to Figure 1, 10 designates a main frame which is rectangular in plan view and includes the forward and rear channel irons 11 and 12, shown in Figure 3. Riveted to the forward cross bar 11 is a downwardly and forwardly extending brace 13. Extending across the frame from front to rear are the supporting irons 14 and detachably mounted upon these supporting irons is a fixed axle 15 held to the supporting irons 14 by means of the plate 16 and the U-bolts 17.

Pivotally mounted upon the ends of the axle are the knuckles 18 having laterally directed spindles upon which the wheels 19 are rotatably mounted, the knuckles having angular arms 20, each connected to a connecting rod section 21.

Bolted, riveted or otherwise attached to the lower flanges of the channel irons 11 and 12 is a horizontally extending channel beam, the flat horizontal web of which is designated 22. This beam, as shown in Figure 3, has its lateral flanges 23 cut away at front and rear of the rear portion of the beam 22 at 24, to accommodate the channel iron 12 and the channel iron 11. Beyond the channel iron 11, these lateral flanges 23 are continued. At the forward end of the beam 22 there is a vertical flange 25 and riveted to this vertical flange is an angle iron 26. A transverse web 27 extends across the channel iron 22 and is supported by the side flanges 23, this web 27 being located beneath the forward end of the brace 13. Extending downward through the brace 13, through the web 27 and through the bottom web 22 of the channel beam is a pivot pin 28.

Mounted upon this pivot pin for swinging movement in a horizontal plane is a tongue 29, the rear end of which carries a sector gear 30. This gear is shown as being a separate piece from the tongue 29 and attached thereto by rivets 31, though we do not wish to be limited to this construction as obviously the lever or tongue 29 may have the sector gear formed thereon in any suitable manner. Rearward of the rear end of the tongue 29 there is pivotally mounted a short lever 32 which is pivoted upon a pin 33 extending downward through the bottom of the channel iron 22. This lever 32 carries upon it a sector gear 33 meshing with the sector gear 30. At its rear end, the lever 32 is pivotally connected to the connecting rod sections 21, as shown in Figure 4. It will be obvious now that upon an oscillation of the tongue 29 in one direction, the lever 32 will be swung in an opposite direction and that this will swing the wheels 19, as shown in dotted lines in Figure 1, and that the wheels 19 will point in the general direction that the tongue points, that is, towards the direction in which the tractor is pulling.

We have illustrated the adjacent portions of the tongue 29 and lever 32 with the sector gears as being supported on a longitudinally extending bar 34 through which the pins 31 and 28 pass. Washers or nuts 35 are disposed upon these pins and held in place by cotter pins 36 or other suitable means.

The forward end of the tongue is strengthened by means of opposed channel irons 37 or like strengthening elements welded and riveted or otherwise connected to the tongue 29 on its underface and the tongue is supported for limited oscillatory movement by the angle iron 26 heretofore described which angle iron has lateral extensions 26a (see Figure 1) which extend laterally and rearward and are bolted, riveted or otherwise attached to the beam 11 of the main frame. Extending downward through the angle iron 26 are bolts 38 carrying spacing sleeves 39 and supporting a cross bar 40 which is in alinement with and approximately the same length as the middle portion of the angle iron 26. Of course, it will be understood that the tongue with its reinforcing element 37 is entirely free to move between the angle iron 26 and the cross bar 40.

In order to provide means whereby a large number of harrows or other implements may be drawn by this draft structure, we have provided two lateral wings, each of which is constructed in the same manner and attached to the main frame in the same manner and, therefore, only one of these wings will be described.

Each wing consists of a rear transversely extending beam or bar 41 and a forward laterally and rearwardly extending bar or beam 42. These beams may be of wood, metal or any other suitable material. The beam 41, as shown in Figure 6, at its lateral extremity is embraced by an approximately U-shaped casting 43 having forwardly extending ears 44. Extending downward through this casting 43 and through the extremity of the beam 41 is a pintle 45 of a caster wheel 46. This wheel has, of course, free movement in a horizontal plane by reason of its pintle 45. The lateral end of beam 42 is embraced within the ears 44 and is attached thereto by means of a bolt or rivet 47. The main frame at its forward corners is provided with the forwardly extending hooks 48 (see Figure 1) and each beam 42 at its inner end has attached thereto an iron 49 formed with an eye to receive the corresponding forwardly directed hook, thus the beam 42 swings upon this hook in a vertical plane. The beam 41 at its inner end has a universal joint connection with the rear corners of the frame 10 which is formed, as shown in detail in Figure 5. Attached to the beam 41 on opposite sides thereof are the irons 50 which are riveted or otherwise attached to the beam 41, these irons extending inward and then being refolded upon themselves, as at 51, to strengthen the ends of the irons. Attached to the upper and underfaces of each rear corner of the frame 10 are the laterally projecting irons 52 and pivoted between these irons is a block 53 shown as pivoted upon a vertical pin 54 passing through the irons 52 and through the block. Transversely through this block passes the horizontal pin 55 formed, in the instance illustrated, by a bolt though obviously, we do not wish to be limited to this. This construction permits each bar 41 to swing forward or rearward from or to the position shown in full lines in Figure 1 or to the position shown in dotted lines in this figure, when the iron 49 is unhooked from the hook 48. This construction also permits the wing formed of the beams 41 and 42 to swing vertically with reference to the main frame.

Riveted, bolted, welded or otherwise attached to the rear transverse beam 12 are the hitch lugs 56 and there may be as many of these lugs as desired. The beams 41 may also be provided with a plurality of hitch lugs such as those shown at 56 or any other means whereby implements may be attached to these beams 41 and trail behind the hitch structure illustrated.

While we have illustrated the tongue 29 as extending straight outward, it will be understood that the tongue, after it passes the supporting bar 40, might be extended upward or downward as most convenient, for engagement with the drawbar of a tractor. It is further to be understood that any suitable means might be used for connecting a plurality of implements either to the rear beam of the main frame or to the rear beams of the lateral frames or wings.

It will be seen that with our construction, the wheels 19 will turn and track with the wheels of a tractor and the caster wheels 46 will also automatically turn and follow the movement of the tractor. Thus the main wheels 19 and the caster wheels will not slide laterally nor dig ruts in the ground or scarify the ground when the hitch is turning corners or turning around. When the lateral wings are not to be used, they may be readily removed by removing the bolts 55 and unhooking the irons 49 from the hooks 48. If, when the wings are used and it be desired to pass the hitch through a farm gate for instance, or on a public road or anywhere where there is not room enough for the wings to pass, the forward beams 42 are unhooked from the hooks 48 and then the wings will fold back to the dotted line position shown in Figure 1, the caster wheels, of course, turning to a position parallel with the wheels 19.

This draft device, in actual practice, has been found capable of pulling from 50 to 60 feet of harrow all connected to a single drafter by the hitch device. The main frame is approximately 12 feet long and can be used to hook two 12 feet weeders thereto or hitch other implements approximately 12 feet long.

While we have illustrated certain details of construction and particular arrangement of parts, we do not wish to be limited thereto as obviously many minor changes might be made without departing from the spirit of the invention as defined in the appended claims.

What is claimed is:

1. A farm implement hitch, including a main frame, knuckles pivotally mounted adjacent the ends of the main frame for oscillation in a longitudinal plane, each knuckle having an angularly related arm, a lever having a sector gear mounted upon the main frame, connections between the rear end of the lever and said knuckle arms, and a tongue pivotally mounted on the frame for oscillation in a horizontal plane and having a sector gear at its rear end meshing with the first named gear whereby to cause the wheels to swing in the general direction of the tongue as it is swung.

2. A farm implement hitch, including a main rectangular frame, a longitudinally extending channel iron extending from front to rear of the frame at the middle thereof and connected to the main frame and projecting beyond it, an axle carried by the main frame, knuckles carried by the ends of the axle, dirigible wheels carried by the knuckles, the knuckles having angular arms, a lever pivotally supported beneath the longitudinally extending angle iron and having a sector gear on its forward end, connecting rod sections between the rear end of the lever and the arms of the knuckles, a tongue pivotally supported beneath the forward portion of the longitudinally extending beam, the rear end of the tongue having a sector gear engaging with the sector gear on the lever, the forward end of the tongue being adapted to be connected to a tractor, and an angle iron brace extending forward from the two ends of the main frame and across above the tongue and a tongue support carried by said brace.

3. A farm implement hitch, including a rectangular main frame, a tongue pivotally mounted thereon for swinging movement in a horizontal plane, dirigible wheels mounted upon the main frame and oscillatable in a horizontal plane, means operatively connecting the rear end of the tongue with said wheels to cause the wheels to turn in the same general direction as the tongue, and wings pivotally connected to the ends of the main frame and extending laterally therefrom and caster wheels supporting the ends of said wings.

4. A farm implement hitch, including a rectangular main frame, a tongue pivotally mounted thereon for swinging movement in a horizontal plane, dirigible wheels mounted upon the main frame and oscillatable in a horizontal plane, means operatively connecting the rear end of the tongue with said wheels to cause the wheels to turn in the same general direction as the tongue, and wings pivotally connected to the ends of the main frame and extending laterally therefrom and caster wheels supporting the ends of said wings, each wing comprising a transversely extending rear beam and a rearwardly and laterally extending forward beam, the forward beam being operatively connected to the adjacent forward corner of the main frame for swinging movement in a vertical plane, the rear beam having a universal joint connection with the rear corner of the frame.

5. A farm implement hitch, including a rectangular main frame, a tongue pivotally mounted thereon for swinging movement in a horizontal plane, dirigible wheels mounted upon the main frame and oscillatable in a horizontal plane, means operatively connecting the rear end of the tongue with said wheels to cause the wheels to turn in the same general direction as the tongue, and wings pivotally connected to the ends of the main frame and extending laterally therefrom and caster wheels supporting the ends of said wings, each wing comprising a transversely extending rear beam and a rearwardly and laterally extending forward beam, the forward beam being operatively connected to the adjacent forward corner of the main frame for swinging movement in a vertical plane, the rear beam having a universal joint connection with the rear corner of the frame, the forward beam being detachably engaged with the forward corner of the main frame and operatively pivoted to the other end of the rear beam whereby the forward beam may be folded inward against the rear beam and both beams turned to a rearwardly extending position.

LEWIS M. MESSERSMITH.
CHESTER O. KISSINGER.